May 9, 1961  TAKAO HASUMI ET AL  2,983,805
METHOD FOR THE ELECTRIC RESISTANCE WELDING OF METALLIC TUBES
Filed March 9, 1959
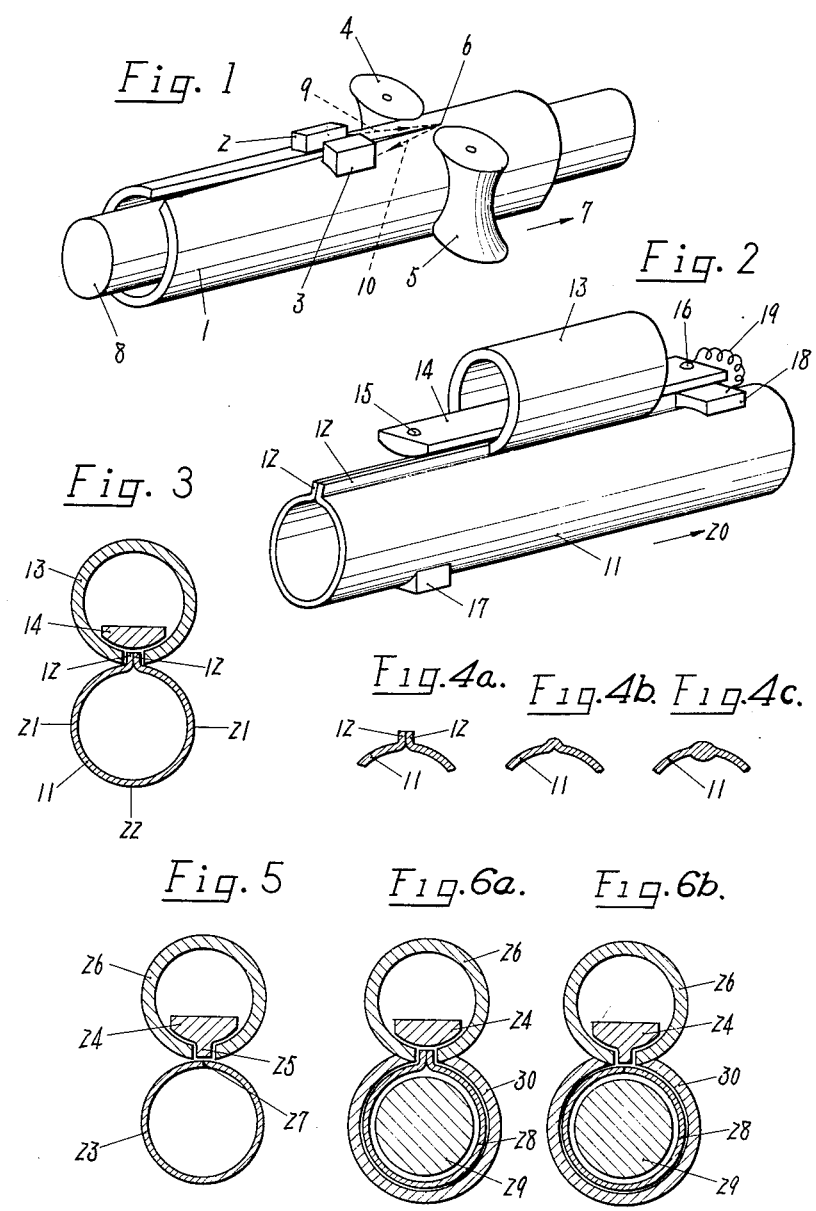

United States Patent Office 2,983,805
Patented May 9, 1961

2,983,805
METHOD FOR THE ELECTRIC RESISTANCE WELDING OF METALLIC TUBES

Takao Hasumi, 1198 Komaemachi Iwato, Kitatamagun, Tokyo, Japan, and Junichi Kawashima, 557 Koyasumachi 2-chome, Hachiojishi, Tokyo, Japan Filed Mar. 9, 1959, Ser. No. 798,266
Claims priority, application Japan Aug. 16, 1958
4 Claims. (Cl. 219—8.5)

This invention relates to a method for the welding of metallic tubes.

Although metallic tubes, such as copper, iron and steel tubes, can be produced by hot or cold drawing, these tubes can also be manufactured by continuous process in such a way that a metal strip is bent into tubing and the tubing welded at the resulting seam.

For this purpose, a current source is generally employed of a commercially available low frequency of, for example, the order of 100 cycles per second, although it has been already proposed to use higher frequency current, for instance, of the order of several hundred cycles per second, for the purpose of concentrating the welding current in the region of the seam to be welded.

It is main object of the invention to provide an improved electric resistance welding method for welding metallic tubes, whereby unfavorable electromagnetic repulsing forces caused by the currents flowing through the opposite edges of the seam in opposite directions can be successfully avoided, thus producing a neat welded seam.

It is a still further object of the invention to provide a method wherein unfavorable circumferential current flowing through the back of the tubing is minimized.

The foregoing and other objects and advantages of the invention will appear more fully hereinafter from a consideration of the detailed description which follows, taken together with the accompanying drawings, wherein several preferred embodiments of the invention are illustrated by way of example.

It is to be expressly understood, however, that the drawings are for illustration purposes only, and are not to be construed as defining the limits of the invention.

In the accompanying drawings,

Figure 1 shows a diagrammatic representation, illustrating a process known per se;

Figure 2 is a similar view, showing a preferred arrangement to carry out the method according to the present invention;

Figure 3 repersents a cross-sectional view of the arrangement shown in Figure 2;

Figures 4a, 4b and 4c are detailed cross-sections, illustrating the welding effect according to this invention;

Figure 5 shows a cross-sectional view, illustrating a somewhat modified arrangement from that shown in Figure 3;

Figures 6a and 6b denote still further modified arrangements according to this invention, again in cross-section.

With reference to Figure 1, an electric welding process known per se for the production of metallic tubes will first be described.

In this process, a metallic tubing 1, shaped from a strip or plate, is continuously advanced through the welder as shown by an arrow 7. A high frequency welding current is supplied between a couple of electrodes 2 and 3, which are arranged in sliding contact with the seam region of the tubing, the latter, while advanced, being compressed in lateral direction by means of pressure rollers 4 and 5, which press the opposite edges of the gap together to form a suitable welding point 6.

The supplied current flows from one of the said electrodes, such as denoted by reference numeral 2, along an edge of the V-shaped-gap of the tube to the weld point 6 thence returns along the opposite edge of the gap to the opposite electrode 3, the current path being shown in the drawing by dotted lines 9 and 10.

In this case, when a magnetic body 8 made from, for instance, ferrite is inserted in the inner space of the tubing 1, the impedance of the unfavorable current path, leading from electrode 2 through the back of the tubing to the opposite electrode 3 may be appreciably increased, thus attaining a concentrated effective current path, as shown by the broken lines 9 and 10, to effect the desired welding. However, the effective current flows through the opposite gap edges in opposite directions as shown, thus providing repulsive forces urging the metal of the seam to be welded to separate into two parts. In extreme ceases, the welded seam includes a number of holes or other defects.

To avoid these undesirable results, the present invention contemplates a method for the electric resistance welding of metallic tubes, characterized in that at least a separate conductor means is arranged in a close proximity, but in non-contacting relation to the seam to be welded and high frequency currents are conducted in the opposite directions through said conductor means and tubing.

With reference to Figures 2 and 3, which show a preferred arrangement to carry out the process according to this invention, 11 denotes a tubing made from copper or a like metallic strip, the opposite edges having opposite flanges 12 bent outwardly.

There is provided a tubular, magnetic body 13 consisting of, for instance, ferrite, and having a longitudinal gap, into which the aforementioned flanges 12 are inserted, while in the inner hollow space of said body 13 there is a conductor bar 14 passing longitudinally through said inner space and arranged in the neighborhood of the gap, the bar being provided at the opposite ends with terminals 15 and 16, respectively. A couple of conductors or electrodes 17 and 18 are kept in sliding contact with the tubing 11 at suitable positions as shown, said terminals 16 being connected through a conductor 19 with one of the electrodes 18. Said tubing is advanced at a constant velocity in the direction shown by arrow 20 by proper means known per se and thus not shown. A high frequency current is applied between said terminal 15 and electrode 17. By the action of this current, circular magnetic fluxes are developed substantially within the tubular magnetic body 13 and substantially pass from one of magnetic poles formed on the both edges of the gap of the tubular magnetic body 13 to the other. Thus a substantial part of the fluxes traverse the seam to be welded and the flanges 12. By this arrangement, the high frequency current flows substantially through the flanges 12, and indeed in the same direction, while, however, eddy currents are produced passing through the back 22 or opposite side surfaces 21 as return paths of the tubing 11. In other words, a substantial part of the main current flows through flanges 12 under the influence known as the "access effect" and the eddy currents are also concentrated substantially therein under the influence of produced magnetic fluxes traversing through the flanges 12. Thus these flanges are fused into a unit with a higher efficiency. As an example, a tubing such as shown by reference numeral 11 could be successfully welded into a complete and perfect tube without, indeed, applying any lateral pressure.

Thus, when a seam of a tubing is electro-resistance-welded as above explained, the supplied and conducted current is substantially concentrated along the flanges 12 by the access effect between tubing 11 and conductor plate 14. At the same time most of the current including induced eddies is also concentrated, in the presence of magnetic body 13, in the same flanges, which are thereby caused to fuse together with higher efficiency. Upon being fused, the flanges or projections contract by the pinch effect. At the same time, the thus contracted flanges are urged to move downwardly under the influence of the repulsive forces caused by the counter action by the current flowing through the conductor bar 14 and, the weld forms a smooth united seam through several successive steps as shown in Figures 4a, 4b and 4c.

Figure 5 shows an alternative arrangement, wherein the seam 27 of the tubing 23 to be welded has no projecting flanges. In such a case, a conductor bar 24 is provided with a longitudinal projection 25. Said projection is inserted during operation into the gap formed in a tubular magnetic body 26. The projection 25 serves as a shield to interrupt the passage of magnetic fluxes, and thus the fluxes are concentrated in the seam 27 of the tubing 23.

By this procedure, the welding process can be carried out as in the preceding arrangement without forming any projection or flange at the seam of the tubing to be welded. A similar effect may be obtained, if the magnetic tubing 26 covers the tubing 23 to be welded from the outside.

Figures 6a and 6b represent further arrangements, wherein a tubular magnetic body 30 and bar 29, both formed of, for instance, ferrite are suitably arranged at the outside as well as at the inside of the tubing 28 to be welded whereby the desired access effect can be further accentuated for the purpose of welding current concentration with still higher efficiency.

It will be clear from the foregoing that, in the processes according to this invention, the high frequency current flows through the opposite edges of the seam to be welded in the same direction, and resulting heat serves for fusing the seam to be welded. Thus, an appreciable reduction of the cross-sectional area of the welded metal part under the influence of the aforementioned pinch effect is effectively attained, thereby providing a smooth welded seam, without any fear of forming unfavorable defects such as openings therein. As a result, the process according to this invention provides highly superior effects in the electro-resistance welding of metallic tubing.

Although only preferred embodiments of the invention have been described in the foregoing specification, it is to be expressly understood that the invention is not limited thereto. It will be obvious that the principles of the invention may be carried into effect by means of a wide variety of specific embodiments, that various features may be combined in different ways and that certain features may be employed to the exclusion of others. The invention is accordingly to understand as embracing all forms of method falling within the scope of the appended claims.

What is claimed is:

1. A method for welding metallic tubes comprising: first forming tubing having a longitudinal gap therethrough from a metallic strip, providing said tubing with outwardly projecting flanges at the opposite edges of said gap; advancing said tubing at a constant rate through a tubular magnetic body having a longitudinal gap so that said flanges pass through and in a close proximity to the longitudinal gap in said tubular magnetic body; and providing a high frequency current along said flanges by means of a conductor bar arranged within the inner space of said tubular magnetic body in close proximity to the flanges to be welded.

2. A method for welding metallic tubes comprising: first shaping a tubing having a longitudinal gap therethrough from a metallic strip; advancing the tubing at a constant rate through a tubular magnetic body so that said gap passes along and in a close proximity to a longitudinal gap in said tubular magnetic body; providing a high frequency current along the opposite edges of said gap in the tubing by means of a conductor bar arranged in a close proximity to said gap in the tubing; and deviating the magnetic fluxes produced by said tubular magnetic body to concentrate the same substantially at said gap in the tubing.

3. A method for welding metallic tubes, comprising: first forming a tubing with a longitudinal gap therethrough from a metallic strip; advancing said tubing at a constant rate along a tubular magnetic body having a longitudinal gap therethrough so that the longitudinal gap of the tubing passes in a close proximity along the longitudinal gap of the tubular magnetic body; and providing a high frequency current along the opposite edges of the gap of the tubing by inserting a conductor bar into said tubular magnetic body and holding the same in close proximity to but separated from the gap of the tubing.

4. A method according to claim 2 wherein welding current concentration is further accentuated by the combined action of a tubular magnetic body and a magnetic rod arranged at the outside as well as inside of the tubing to be welded.

References Cited in the file of this patent

UNITED STATES PATENTS

| | | |
|---|---|---|
| 2,020,276 | Crawford | Nov. 5, 1935 |
| 2,024,906 | Bennett | Dec. 17, 1935 |
| 2,066,668 | Bennett | Jan. 5, 1937 |
| 2,833,910 | Stanton et al. | May 6, 1958 |